United States Patent
Tarnowski

(10) Patent No.: US 10,060,414 B2
(45) Date of Patent: Aug. 28, 2018

(54) METHOD FOR COORDINATING FREQUENCY CONTROL CHARACTERISTICS BETWEEN CONVENTIONAL PLANTS AND WIND POWER PLANTS

(71) Applicant: VESTAS WIND SYSTEMS A/S, Aarhus N (DK)

(72) Inventor: Germán Claudio Tarnowski, Virum (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 865 days.

(21) Appl. No.: 14/399,259

(22) PCT Filed: May 10, 2013

(86) PCT No.: PCT/DK2013/050137
§ 371 (c)(1),
(2) Date: Nov. 6, 2014

(87) PCT Pub. No.: WO2013/167140
PCT Pub. Date: Nov. 14, 2013

(65) Prior Publication Data
US 2015/0120070 A1    Apr. 30, 2015

Related U.S. Application Data

(60) Provisional application No. 61/663,998, filed on Jun. 25, 2012.

(30) Foreign Application Priority Data

May 11, 2012   (DK) .................... 2012 70247

(51) Int. Cl.
*F03D 7/02* (2006.01)
*F03D 7/00* (2006.01)
(Continued)

(52) U.S. Cl.
CPC .............. *F03D 7/028* (2013.01); *F03D 7/00* (2013.01); *F03D 7/0284* (2013.01); *G05F 1/66* (2013.01);
(Continued)

(58) Field of Classification Search
None
See application file for complete search history.

(56) References Cited

U.S. PATENT DOCUMENTS

2007/0100506 A1* 5/2007 Teichmann ............... H02J 3/24
                                                    700/297
2008/0150283 A1   6/2008 Rivas et al.
(Continued)

FOREIGN PATENT DOCUMENTS

EP    2270332 A1   1/2011
EP    2393179 A2   12/2011
(Continued)

OTHER PUBLICATIONS

International Search Report for PCT/DK2013/050137, dated Sep. 17, 2013.
Danish Search Report for PA 2012 70247, dated Dec. 11, 2012.

*Primary Examiner* — Qing Yuan Wu
(74) *Attorney, Agent, or Firm* — Patterson + Sheridan, LLP

(57) ABSTRACT

The present invention relates to a method for operating an electrical power system, comprising at least one wind turbine generator and at least one other power source, the method comprises the steps of, setting a set of technical requirements and limits for the electrical power system, including a total power reserve and at least one of: maximum electrical frequency deviation and allowable wind power electrical frequency fluctuations, distributing the total power reserve between the at least one other power source and a total wind power capacity available from the at least one (Continued)

wind turbine generator, and calculating in response thereto an amount of power reserve from the at least one wind turbine generator, and providing settings for a wind power controller, the settings comprising the set of technical requirements and the amount of power reserve from the at least one wind turbine generator. The invention also relates to a power plant operating according to the method.

10 Claims, 4 Drawing Sheets

(51) Int. Cl.
  *G05F 1/66* (2006.01)
  *H02J 3/38* (2006.01)
  *G05B 15/02* (2006.01)

(52) U.S. Cl.
  CPC ............... *H02J 3/38* (2013.01); *H02J 3/386* (2013.01); *G05B 15/02* (2013.01); *Y02E 10/763* (2013.01)

(56) References Cited

U.S. PATENT DOCUMENTS

| | | | |
|---|---|---|---|
| 2011/0001318 A1* | 1/2011 | Nelson | F03D 7/0272 290/44 |
| 2015/0001931 A1* | 1/2015 | Banham-Hall | H02J 3/386 307/24 |

FOREIGN PATENT DOCUMENTS

| | | | |
|---|---|---|---|
| WO | 2009/024833 A1 | 2/2009 | |
| WO | 2012/019613 A1 | 2/2012 | |

\* cited by examiner

| System state | | Frequency range [Hz] | | |
|---|---|---|---|---|
| A | Normal operating range | 49.8 to 50.2 | 49.5 to 50.5 | 49.9 to 50.1 |
| B | Transmission system disturbances | Between 48.0-49.8 (low) | Between 47.5-49.5 (low) | Between 49.5- 49.9 (low) |
| | | Between 50.2-52.0 (high) | Between 50.5-52.0 (high) | Between 50.1- 52.0 (high) |
| C | Exceptional transmission system | Between 47.0-48.0 (low) | Between 47.0-47.5 (low) | Between 47.0- 49.0 (low) |

METHOD FOR COORDINATING FREQUENCY CONTROL CHARACTERISTICS BETWEEN CONVENTIONAL PLANTS AND WIND POWER PLANTS

FIELD OF THE INVENTION

The present invention relates to a method of operating a power plant, with at least one wind turbine generator connected to an electrical grid and at least one other power source, and controlling the electrical frequency of the electrical grid. The invention also relates to a power plant operating according to the method.

BACKGROUND OF THE INVENTION

In an electrical utility grid consumers can usually consume electric power in an uncontrolled manner. Since hardly any energy is stored in the grid, there can be no imbalance between the power produced and the power consumed. Therefore, the momentary production of power shall match the momentary power consumption. Overproduction leads to an increase of the grid frequency beyond the nominal value (e.g. 50 or 60 Hz), since the conventional synchronous generators accelerate, while over consumption will lead to a decrease of the grid frequency beyond the nominal value (e.g. 50 or 60 Hz), since the conventional synchronous generators will then decelerate.

In order to stabilize the frequency of the electrical grid, conventionally about 10% of the producers contribute to what is called "primary power control". These producers, also referred to as "primary controllers", increase power output when the frequency falls below the nominal value and decrease power output when it rises above the nominal value.

Conventionally, wind turbine generators do not contribute to primary control, firstly because wind turbine generators can't normally increase their output power by command (as they normally operate at nominal load or, when operating at partial load, at an optimal working point), and secondly because the available wind power shall normally be entirely exploited.

Generally, wind power adds an additional moment of grid instability because, with a significant fraction of wind power in a grid, not only the consumption is uncontrolled, but also the production by wind turbine generators. Even though wind forecasts enable the wind power production to be predicted with considerable accuracy on a long-term basis (at the level of hours), the wind speed normally fluctuates in an unpredictable manner on a short-term basis (at the level of minutes down to a few seconds). A wind turbine generator operating at partial load (i.e. when the wind speed is below the nominal wind speed of the wind turbine generator considered) will normally transform these wind-speed fluctuations into corresponding fluctuations of the amount of real power produced and supplied to the electrical grid. Only at wind speeds above nominal, when a wind turbine generator operates at nominal load, wind turbine generators normally control their output power to be constant at the nominal output power.

The consequence of fluctuating-power production by wind turbine generators on the grid stability depends on characteristics of the grid. In a large, stable grid a power fluctuation by a wind turbine generator or wind power plant will not produce any significant response in the form of a frequency fluctuation. Thus, such grids can cope with higher power variations.

The operation of relatively large amounts of wind power together with conventional power plants needs to be coordinated in terms of regulating characteristics and power reserves, aiming at the power balance and frequency stability of the grid. The need for coordination is more evident when the wind power production participates with regulation services for the system.

SUMMARY OF THE INVENTION

This Summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In an aspect, the present invention relates to a method for operating an electrical power system, comprising at least one wind turbine generator and at least one other power source, the method comprises the steps of:

setting a set of technical requirements and limits for the electrical power system, including a total power reserve and at least one of: maximum electrical frequency deviation and allowable wind power electrical frequency fluctuations;

distributing the total power reserve between the at least one other power source and a total wind power capacity available from the at least one wind turbine generator, and calculating in response thereto an amount of power reserve from the at least one wind turbine generator;

providing settings for a wind power controller, the settings comprising the set of technical requirements and the amount of power reserve from the at least one wind turbine generator.

An advantage of first aspect is that method provides a more stable grid operation of power systems with large amount of wind power.

According to one embodiment of the invention the method further comprises the step of:

Detecting if the electrical power system is in a normal operation mode or in a disturbance regulation, and act accordingly.

An advantage of the embodiment is that it is possible to operate the power system with two different set of parameters depending on the mode.

According to one embodiment of the invention the set of technical requirements include both a value for allowable wind power electrical fluctuations and a value for maximum acceptable electrical frequency deviation.

An advantage of the embodiment is that if provides coordination between the wind power electrical fluctuations and acceptable electrical frequency.

According to one embodiment of the invention the step of determining the total power reserves, is based on:

the maximum electrical frequency deviation and a system frequency activated power reserve, and the maximum allowable wind power electrical frequency fluctuations and a dead band of a speed-governor of the at least one conventional plants.

According to one embodiment of the invention the total power reserve is a summation of a power reserve from the at least one other power source and the amount of power reserve from the at least one wind turbine generator.

According to one embodiment of the invention the wind power curtailment is larger or equal than the amount of power reserve from the at least one wind turbine generator.

An advantage of the embodiment is that there is more available curtailed wind power than required for power reserve.

According to one embodiment of the invention a set of parameters for a wind power frequency controller is determined, including at least one or more of:

A frequency dead band, a frequency response characteristic, wind power fluctuation, a wind power curtailment and power tracking ramp rate.

According to one embodiment of the invention the frequency response characteristic is calculated as:

$$R_{Wind} = \frac{\Delta f_{Max} - DB_{Wind}}{f_0} \cdot \frac{\sum_n P_{N-WPPi}}{\Delta P_{ResWind}}$$

An advantage of first aspect is that the frequency response characteristic is well defined.

According to one embodiment of the invention the wind power fluctuation is calculated as:

$$\Delta P_{WindFluct} = \frac{\Delta f_{WindFluct} - DB_{Conv}}{\Delta f_{Max} - DB_{Conv}} \Delta P_{ResConv}$$

An advantage of first aspect is that the wind power fluctuation is well defined.

In a second aspect, the present invention relates to an electrical power system, comprising at least one wind turbine generator and at least one other power source, and a controller being arranged to operate according to the method.

The advantages of the second aspect and its embodiments are equivalent to the advantages for the first aspect of the present invention.

The individual aspects of the present invention may each be combined with any of the other aspects. These and other aspects of the invention will be apparent from the following description with reference to the described embodiments.

Any of the attendant features will be more readily appreciated as the same become better understood by reference to the following detailed description considered in connection with the accompanying drawings. The preferred features may be combined as appropriate, as would be apparent to a skilled person, and may be combined with any of the aspects of the invention.

BRIEF DESCRIPTION OF THE FIGURES

The power system and its method according to the invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

Figure 1:
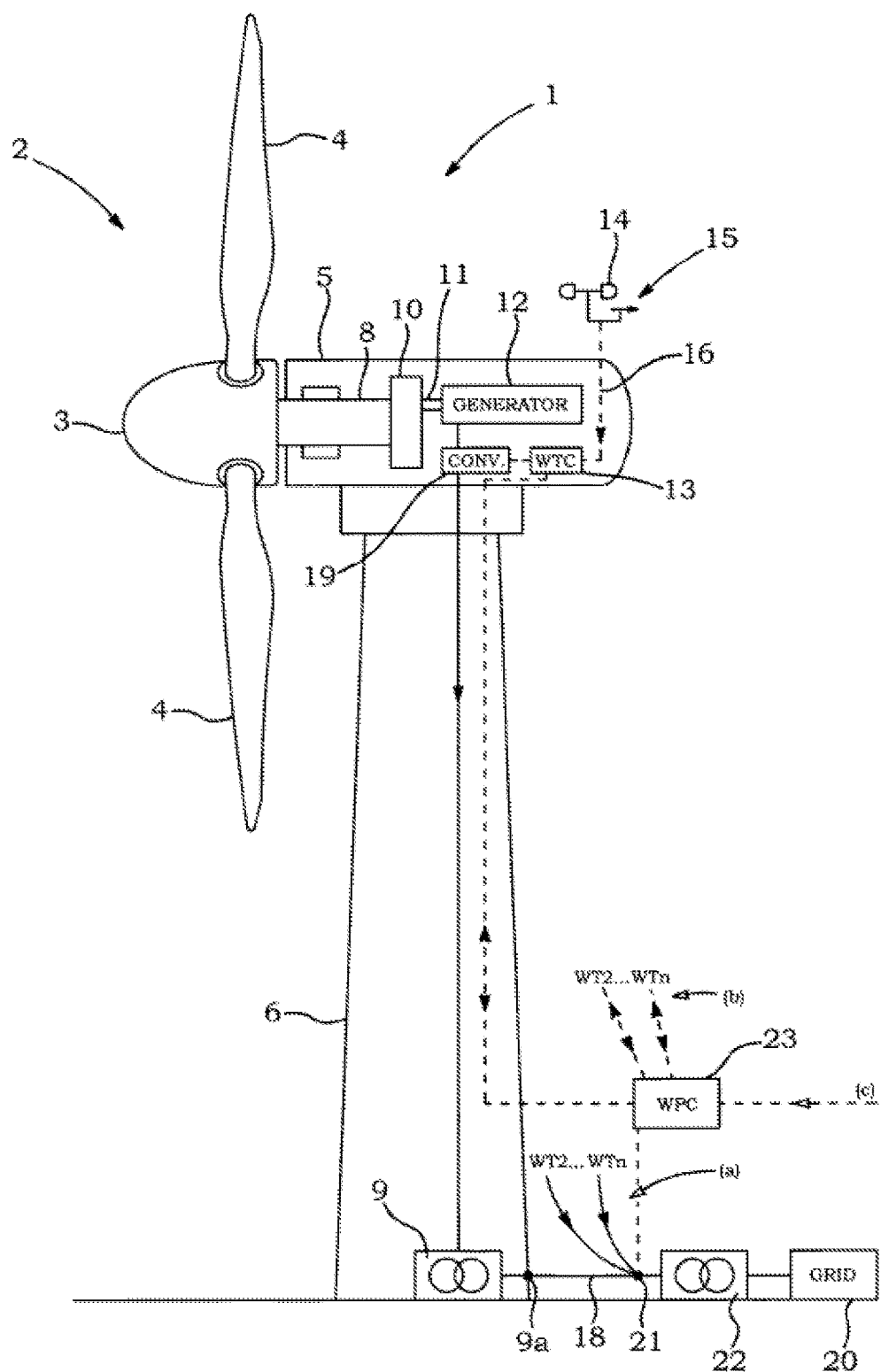
FIG. 1 shows a wind turbine generator according to the present invention

The present invention will now be explained in further details. While the invention is susceptible to various modifications and alternative forms, specific embodiments have been disclosed by way of examples. It should be understood, however, that the invention is not intended to be limited to the particular forms disclosed. Rather, the invention is to cover all modifications, equivalents, and alternatives falling within the spirit and scope of the invention as defined by the appended claims.

The individual elements of an embodiment of the invention may be physically, functionally and logically implemented in any suitable way such as in a single unit, in a plurality of units or as part of separate functional units. The invention may be implemented in a single unit, or be both physically and functionally distributed between different units and processors.

The embodiments of the present invention pertain to a power system with a plurality of wind turbine generators (e.g. a variable-speed wind turbine generator) and the operation of relatively large amounts of wind power together with conventional power plants needs to be coordinated in terms of regulating characteristics and power reserves, aiming at the power balance and frequency stability of the grid. The need for coordination is more evident when the wind power production participates with regulation services for the system.

Coordination between wind and conventional production involves setting the parameters of the wind power controls for: i) normal operation regulation, ii) disturbance regulation (contingency) and iii) inertial response.

Wind turbine generators (e.g. a variable-speed wind turbine generator) which supplies power to an electric grid which may be equipped with other regulation capacity against grid-frequency and active power fluctuations. "Electric grid" or "grid" is a utility grid outside the boundary and point of common coupling of a wind power plant; when reference is made to the grid within a wind power plant an expression with explicit indication to the wind power plant is made, e.g., "wind-park grid". Regulation capacity against grid-frequency fluctuations is, e.g., provided by a certain fraction (typically about 10%) of primary controllers, which are typically conventional producers, which may use steam- or gas-driven turbines and fossil energy sources, or hydropower). The primary controllers increase power output when the frequency falls below the nominal value (e.g. 50 or 60 Hz) and decrease power output when it rises above the nominal value.

As the present text deals with active power rather than reactive power, active power is briefly referred to as "power", or "output power". Where reactive power is addressed, it is explicitly referred to as "reactive power"

There is an upper limit to the output power which can be produced by the wind turbine generator according to the embodiments, e.g. due to structural limits and a current limit in the wind turbine generator's electric converter. This amount of power is referred to as "nominal power". The wind speed sufficient for the wind turbine generator to produce the nominal power is referred to as "nominal wind speed". When the wind turbine generator according to the embodiments operates at wind speeds above the nominal wind speed, only that fraction of the available wind power is transformed to electric output power which corresponds to the nominal power. This reduction of power production is, e.g., achieved by gradually changing the rotor-pitch angle towards the so-called flag position. In other words, the wind turbine generator intentionally is not operated at optimum efficiency. In some embodiments the wind turbine generator is also operated at a sub-optimal tip-speed ratio so as to reduce structural loads.

By contrast, during operation at partial load, i.e. at wind speed below the nominal wind speed, the wind turbine generator according to the embodiments is operated at optimum efficiency. For example, it is operated with the aerodynamically optimal blade pitch angle and tip-speed ratio. Generally, the wind speed fluctuates in an unpredictable manner on a short-term basis (at the level of minutes down to a few seconds). When operating at partial load and with optimum efficiency the wind turbine generator according to the embodiments transforms these wind-speed fluctuations in a nearly one-to-one manner into corresponding wind-caused fluctuations of the amount of real power produced and supplied to the electrical grid. Fluctuations in the wind direction may also contribute to the wind-caused fluctuations of the amount of real power produced result in and supplied to the electrical grid because a wind-turbine's yaw adjustment mechanism is generally not able to immediately align the wind turbine generator's rotor axis to the wind direction. A misaligned rotor has a reduced efficiency so that fluctuations in the wind direction are a further source of wind caused fluctuations of the amount of real power produced and supplied to the electrical grid.

As mentioned at the outset, the consequence of fluctuating-power production by wind turbine generators on the grid stability depends on characteristics of the grid. In a large, stable grid a power fluctuation by a wind turbine generator or wind power plant will not produce any significant response in the form of a frequency fluctuation. However, in a small isolated grid, or in weak grids, such a power fluctuation may produce a significant frequency fluctuation. A certain ability of the grid to compensate imbalances of power production and compensation and regulate resulting frequency variations, i.e. a certain degree of stiffness or weakness of the grid, is referred to as "grid-stability".

The inventor has recognized that the grid-stability may vary over time, for example due to grid related failures, such as islanding of that part of the grid in which the wind turbine generator is located, due to primary-producer failures, etc. The inventor has also recognized that a deterioration of the grid stability can be detected by monitoring e.g. frequency fluctuations on the grid. Moreover the inventor has recognized that it is desirable in the case of a deterioration of the grid stability conditions to limit the output-power fluctuations produced by the wind turbine generator and supplied to the grid or if the wind turbine generator has already operated with limited output-power fluctuations before the deterioration occurred—to reduce the already existing fluctuation limit. "Reducing" the fluctuation limit means making the limit stricter. By this measure, although the wind turbine generator according to the embodiments does not operate as a primary controller, it contributes to grid stability by reducing source-induced fluctuations. However, limiting the output power fluctuations the accumulated power output will generally be reduced and thereby the effective efficiency of the wind turbine generator lowered. However, by restricting this measure to situations in which the grid-stability is (temporarily) deteriorated, the loss of electric energy produced will be limited.

In the embodiments limiting the active-power fluctuations is, e.g., achieved by means of blade pitch adjustment. In some embodiments active-power fluctuations are also limited electrically, by corresponding control of the wind turbine generator's electric-power converter. However, the later results in imbalance between the amount of wind power converted into mechanical power of the wind turbine generator's rotor and the electric output power which, e.g., results in acceleration of the rotor.

Therefore, in some embodiments electrically limiting power is only performed in combination with blade-pitch adjustment to cope with wind-speed transients For example, when the wind speed rises faster that the pitch can be adjusted to compensate for the wind speed rise, the output power is first limited electrically and, once the blades have been pitched to their new pitch angle, is then limited by the pitch adjustment.

The monitoring and limit-adjustment function is a self-diagnosis and self-adjustment function performed by a control system at the level of individual wind turbine generators, or at the level of a wind power plant, or at a higher level in the utility grid. The control system can also be distributed, e.g. include controllers at the wind-park and the wind-turbine level.

In some embodiments the frequency range covered by grid-frequency fluctuations is permanently determined, and a variation of the grid frequency outside an allowed-frequency range $F_{max}/F_{min}$ (between an allowed maximum frequency $F_{max}$ and an allowed minimum frequency $F_{min}$) range is considered to be a detection of a reduced grid stability condition, i.e. a frequency dead band. Alternatively or in addition, the variance of the grid frequency is permanently determined, and a rise beyond a variance threshold is considered to be a detection of a reduced grid stability condition. The allowed fluctuation of the wind turbine generator's or wind power plant's power output is then reduced.

In some embodiments monitoring whether the grid-frequency fluctuations are within the allowed-frequency range, or whether their variance is below the variance threshold is performed in an absolute manner, i.e. without taking into account any correlation of the grid frequency and the output power produced by the wind turbine generator or wind power plant.

However, correlation-less monitoring grid-frequency fluctuations is somewhat unspecific in the sense that it is not ensured that the fluctuation of the wind-turbine or wind power plant considered actually contributes to the grid-frequency fluctuations observed. Therefore, in these embodiments the reduction of the fluctuation limit might be in vain, and would only produce costs (by the reduction of the accumulated power output caused by it). Therefore, in other embodiments the monitoring of grid stability comprises determining a correlation between power supplied to the electrical grid and grid frequency. Correlation means that if the power output increases the grid frequency also increases. The grid frequency is, e.g. measured at the wind turbine generator's terminals or at a wind power plant's point of coupling to the grid. If, however, no increase of the grid frequency is observed upon increase of the output power there is no correlation. Actually, "correlation" can be a continuous parameter measuring the degree of coincidence between the output power increase and the grid frequency rise.

In some of the embodiments, the bigger is the correlation thus determined, the smaller is the grid stability detected. To be considered as an indicator for reduced grid stability, a rise of the correlation has to be significant in some embodiments, e.g. the rise has to exceed a maximum-acceptable correlation threshold. The allowed fluctuation of the wind turbine generator's output power is then reduced. Linking the reduction of the fluctuation limit to the observed correlation between output-power fluctuations and grid-frequency fluctuations ensures that the reduction of the output-power fluctuation limit actually contributes to reduction of the grid-frequency fluctuations.

In some embodiments, the correlation information is used to determine whether the variation of the grid frequency extends beyond the allowed-frequency range $F_{max}/F_{min}$ or whether the frequency variance exceeds the variance limit, by taking only those peaks (or dips) in the grid frequency into account which can be attributed to a corresponding peak (or dip) of the output power of the wind turbine generator or wind power plant considered. This is taking into account correlation on a peak-by-peak basis.

In other embodiments the correlation information is used for the same purpose more globally, (not peak-by-peak) by multiplying the uncorrelated fluctuation amplitude by the magnitude of the correlation, which may be a number between 0 and 1 (or by multiplying the uncorrelated frequency variance by the square of the fluctuation). "Diluting" the observed uncorrelated fluctuation amplitude or variance in this manner takes into account that only a fraction of the observed uncorrelated fluctuation amplitude or variance is due the output-power fluctuations of the wind turbine generator or wind power plant considered.

A prerequisite of such a correlation measurement is that there is a variation of the wind turbine generator's output power. In some embodiments, also referred to as "passive-variation embodiments", use is made of the output power variations caused by the natural wind-speed variations. These passive-power variations are tracked and correlated with the measured grid frequency.

In some embodiments the limit on power fluctuations is chosen such that the grid-frequency fluctuations caused by the supply of power are maintained inside the range $F_{max}/F_{min}$ or the variance of grid-frequency fluctuations caused by the supply of power is maintained below the variance limit.

In some of these embodiments the entire grid-frequency fluctuation (including the contribution not caused by the wind turbine or wind park considered) is to be maintained inside the range $F_{max}/F_{min}$ or below the variance threshold, while in other embodiments only that fraction of the grid-frequency fluctuations which is caused by the power supply of the wind turbine or wind park considered is maintained inside the range Fmax/Fmin or below the variance threshold.

In some of the embodiments in which the (entire or fractional) grid-frequency fluctuation is to be maintained inside the range $F_{max}/F_{min}$ or below the variance threshold, the fluctuation limit to the output power is continuously adjusted to that extent of limit just needed to keep the grid frequency inside the range $F_{max}/F_{min}$ or the variance below the variance threshold. That means that the power production by the wind turbine or wind park is maximized by letting the output power fluctuate, but the fluctuation is limited, or modulated, if the grid frequency goes beyond $F_{max}/F_{min}$ Thus, the objective the continuous adjustment is to avoid the grid frequency to go out of the $F_{max}/F_{min}$ range without losing more power production than necessary.

In some embodiments the operation of the wind turbine is automatically switched between two discrete operation modes, that is to say from a normal-operation mode (i.e. a mode with no power-fluctuation limit, or with a relatively relaxed power-fluctuation limit) to a reduced fluctuation mode (in which the power fluctuation limit is activated). The automatic mode switch from the normal-operation mode to the reduced-fluctuation mode is triggered, in some of these embodiments, by detection of a reduction of the grid stability beyond a lower mode-switch threshold. Switching from the reduced-fluctuation mode back to the normal-operation mode can likewise be triggered by detection of an increase of the grid stability beyond an upper mode-switch threshold.

In some of the mode-switching embodiments the reduced-fluctuation mode is maintained a minimum time interval before the mode can switch back to the normal-operation mode. By this measure too frequent mode switching can be avoided. Moreover, there may be a contractual agreement with the grid provider according to which the wind-power producer is committed to supply output power with strongly limited output-power fluctuation during a predetermined time interval, say 15 min. The wind-power producer can be compensated for the production loss suffered due to this (exemplary) 15-min. period of smooth output power supply.

In some of the mode-switching embodiments the power-fluctuation limit is kept constant during the reduced-fluctuation mode. Constancy of the power-fluctuation limit refers to the width of the limit relative to a mean output power; it does not necessarily mean that the absolute values of the upper and lower power limits are kept constant. In some embodiments the limit is relative a mean value of the power produced. For example, if the mean power produced increases with time, the absolute values of the upper and lower power-fluctuation limits will also increase.

In other mode-switching embodiments the fluctuation limit is also adjusted to avoid the grid frequency to go out of the $F_{max}/F_{min}$ range without losing more power production than necessary, as was described above. This adjustment may be stepwise (an setting adjusted at the beginning of mode switch and then kept constant for a certain period of time) or continuous. Thus, the output-power adjustment to keep the grid frequency inside the range $F_{max}/F_{min}$ or below the variance threshold, to that extent of limit just needed to keep the grid frequency inside the range $F_{max}/F_{min}$ or the variance below the variance threshold applies to both the continuous-adjustment embodiments and the mode-switching embodiments.

It has already been mentioned that limiting power fluctuation may result in a loss of accumulated power. A loss of accumulated power could be avoided if not only peaks of the output power ("positive fluctuations") were cut, but also dips of the output power ("negative fluctuations") were lifted, or filled up, in a symmetric manner. However, in some embodiments the wind turbine is at its optimal working point during normal-mode operation, which does not allow any increase of the output power. Therefore, limiting output fluctuations is rather performed in an asymmetric manner, by cutting the output power during positive fluctuations (cutting high output peaks), without (or without significantly) lifting the relative output power during negative fluctuations. As explained above, cutting the output power during positive fluctuations is, e.g., achieved by a corresponding adjustment of the blade-pitch angle towards the flag position.

The strictness of the limit on output-power fluctuations, and/or the position of the threshold which has to be exceeded by the grid instability so that mode switching is performed, may also depend on other factors than the monitored grid stability.

For example, in some of the embodiments a wind forecast is used to vary the fluctuation limit, e.g. to make it stricter when the forecast predicts increased wind-power fluctuation. Moreover, in mode-switching embodiments the mode-switch threshold may be varied in response to the wind forecast. For example, the threshold may be varied upon a forecast of increased windpower fluctuation such that switching from the normal-operation mode to the reduced fluctuation mode is already triggered at a less pronounced reduction of the grid stability.

Similarly, in other embodiments an expectation of power consumption in the electrical grid is used to vary the fluctuation limit, or to vary the mode-switch threshold. For example, a power consumption expectation giving rise to expectation of increased grid-frequency fluctuation may render the fluctuation limit stricter, or modify the mode-switch threshold such that switching from the normal-operation mode to the reduced-fluctuation mode is already triggered at a less pronounced reduction of the grid stability.

Some embodiments pertain to a control system arranged to control at least one wind turbine which may include some, or all, of the wind turbines of a whole wind park, in the manner describe above. The control system may be an individual wind turbine controller, a wind power plant controller, a power plant controller or a controller at a higher level in the grid and connected to the wind-turbine controller to send limit-fluctuation commands. The control system can be distributed, e.g. include controllers at the wind-park and the wind-turbine level or utility-grid level.

Some embodiments pertain to a control system arranged to control at least one wind turbine which may include some, or all, of the wind turbines of a whole wind park, in the manner describe above. The control system may be an individual wind turbine controller, a wind power plant controller, a power plant controller or a controller at a higher level in the grid and connected to the wind-turbine controller to send limit-fluctuation commands. The control system can be distributed, e.g. include controllers at the wind-park and the wind-turbine level or utility-grid level.

A variable speed wind turbine generator, which is used in at least one of the above described embodiments and which is capable for being connected to an electrical grid is equipped with the control system described above. It comprises a rotor with a hub and at least one blade mounted to the rotor as discussed above. The rotor is connected, for example via a main shaft, to a generator for translating the torque of the rotor into electrical power. In some embodiments, a gearbox is interconnected between the rotor and the generator in order to translate the rotational speed of the rotor into a higher speed for the generator.

FIG. 1 shows, an exemplary variable-speed wind turbine generator (WPS) 1 is one of a plurality of wind turbine generators of a wind power plant (WPP) 2. It has a rotor 3 with a hub to which, e.g., three blades 4 are mounted. The pitch angle of the rotor blades 4 is variable by means of pitch actuators. The rotor 3 is supported by a nacelle 5 and drives a generator 12 via a main shaft 8, a gearbox 10, and a high speed shaft 11. This structure is exemplary; other embodiments, for example, use a direct-drive 15 generator.

The generator 12 (e.g. Induction or synchronous generator) produces electrical output power of a frequency related to the rotation speed of the rotor 3, which is converted to grid frequency (e.g. about 50 or 60 Hz) by a converter 19. The voltage of the electric power thus produced is up-transformed by a transformer 9. The output of the transformer 9 is the wind turbine generator's terminals 9a. The electric power from the wind turbine generator 1 and from the other wind turbine generators of the wind power plant 2 is fed into a wind-park grid 18 (symbolized by "a" in FIG. 1). The wind power plant grid 18 is connected at a point of common coupling 21 and an optional further step up transformer 22 to a wind power plant external electrical utility grid 20. The grid 20 is equipped with regulation capacity against grid-frequency fluctuations, e.g. in the form of conventional producers which can increase and lower production on a short-time scale to control frequency.

A control system includes a wind-turbine controller 13 and a wind power plant controller 23.

The wind-turbine controller 13 controls operation of the individual wind turbine generator 1, e.g. selects the full-load or partial-load operation mode, depending i.a. on the current wind speed, causes, in the partial load mode, operation of the wind turbine generator at the optimal working point by adjusting the blade angle and controlling the tip speed ration to the aerodynamic optimum at the current wind speed, and controls the converter 19 to produce electricity according to prescriptions of the wind-park-controller, e.g. an instruction to provide a certain amount of reactive power in addition to the active power, etc. The wind-turbine controller 13 uses different input signals to perform its control tasks, for example signals representing current wind conditions (e.g. from an anemometer 14 and a wind vane 15), feed-back signals representing pitch angle, rotor position, amplitudes and phases of the voltage and current at the generator 12 and the terminals 9a, etc., and command signals from the wind-park controller 23. The wind-park controller 23 receives signals representative of the voltage, current and frequency at the point of common coupling 21 (parameters which may be considered to represent the voltage, current and frequency in the utility grid 20) and, optionally, receives information or command signals from the utility-grid provider (at "c" in FIG. 1). Based on some of these (and, optionally, further) input parameters the wind-park controller 23 monitors grid stability and, upon detection of a reduction of grid stability, commands the wind-turbine controllers 13 of the wind turbine generator 1 and the other wind turbine generators of the wind power plant 2 (at "b" in FIG. 1) to change operation by limiting fluctuations of the output power supplied. Upon receipt of such a command the wind-turbine controller 13, upon increase of the wind speed, cuts the high-output peak which would then be produced in normal partial-load operation with maximum efficiency, e.g., by adjusting the blade-pitch angle towards the flag position, to comply with the wind-park controller's limit-fluctuation command. Thus, in the exemplary embodiment of FIG. 1 the control task of the control system to limit output fluctuations is shared by the wind-park controller 23 and the wind-turbine controller 13. In other embodiments this control task is performed by the wind turbine controller 13 alone; in those embodiments, the "control system" is represented just by the wind turbine controller 13, without a wind-park controller.

Although the wind turbine generator 1 shown in FIG. 1 is expected to have three blades 4, it should be noted that a wind turbine generator may have different number of blades. It is common to find wind turbine generators having two to four blades. The wind turbine generator 1 shown in FIG. 1 is a Horizontal Axis Wind Turbine (HAWT) as the rotor 4 rotates about a horizontal axis. It should be noted that the rotor 4 may rotate about a vertical axis. Such a wind turbine generators having its rotor rotate about the vertical axis is known as a Vertical Axis Wind Turbine (VAWT). The embodiments described henceforth are not limited to HAWT having 3 blades. They may be implemented in both HAWT and VAWT, and having any number of blades 4 in the rotor 4.

The coordination of the normal and the disturbance regulations requires setting the parameters of the control. Those parameters are: frequency control dead band, $DB_{Wind}$ (within the range $F_{max}/F_{min}$), frequency response characteristic, $R_{Wind}$ (droop); allowed overall wind power fluctuation, $\Delta P_{WindFluct}$; power tracking ramp rate, $Ramp_{Wind}$ and amount of wind power reserve $P_{ResWind}$. A basic algorithm for this coordination is proposed here.

Figure 2:
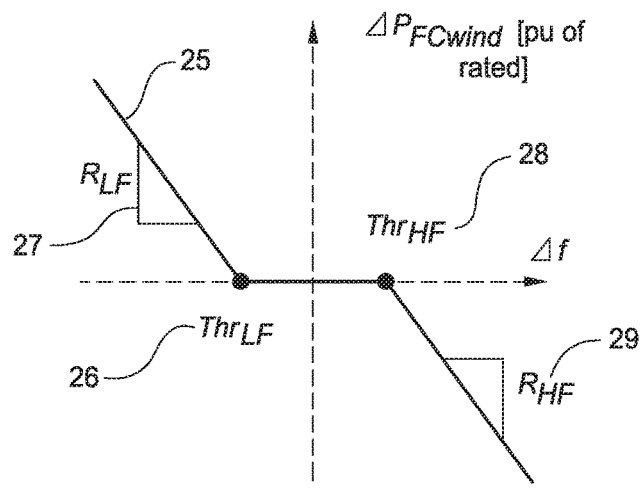
FIG. 2 shows frequency response characteristic.
Figure 3:
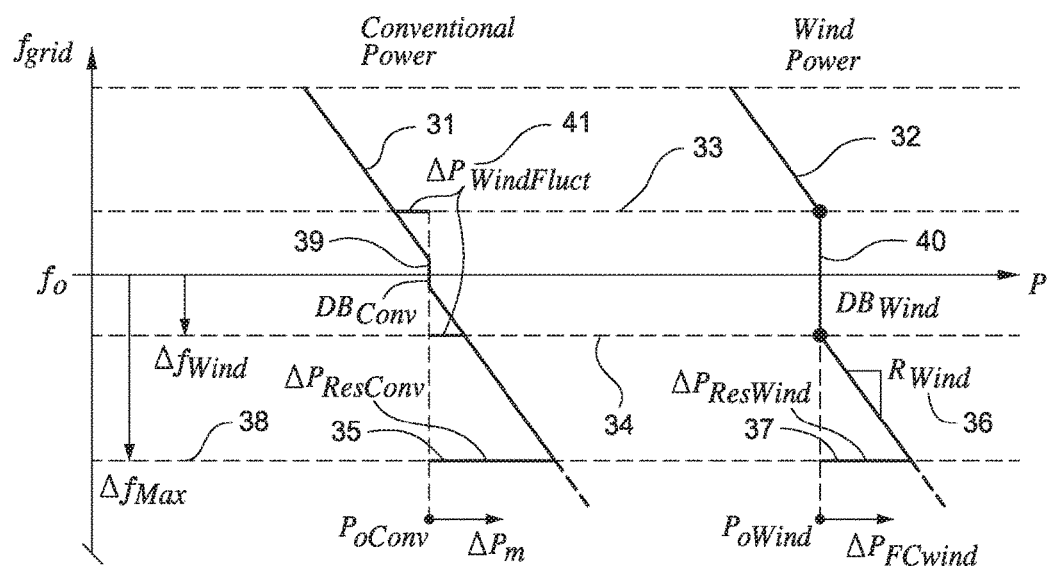
FIG. 3 is system frequency response characteristics from conventional generation (left) and wind power generation (right).

In order to simplify the presentation of the concept, the distinction between normal regulation and disturbance regulation is not considered in the algorithm. This means that the specified values of maximum frequency deviation and required power reserves can be thought as characterizing either operation of normal regulation or disturbance regulation (obviously, the respective values will be different). As grid codes specify a linear frequency response (static) from conventional plants, the combined (equivalent) response at system level is as shown in FIG. 3 left side, where the maximum frequency deviation $\Delta f_{Max}$ 38 and the required conventional power reserve $\Delta P_{ResConv}$ 35 are used. The wind power frequency response as defined in FIG. 2 is also depicted here at the right side of FIG. 3. In FIG. 2 the frequency response 25 is given by a low frequency threshold 26 together with a low frequency droop rate $R_{LF}$ 27, and a high frequency threshold 28 together with a high frequency droop rate $R_{HF}$ 29. Because in the chosen wind power control architecture the frequency response is managed centrally, FIG. 3 lumps the overall system frequency response in two main groups:

a) conventional generation frequency response and
b) wind power generation frequency response. The coordination between these two groups is carried out here and based on FIG. 3.

FIG. 3 shows the frequency response for the conventional power 31, that has a dead band $DB_{conv}$ 39, which is clearly within the upper and lower limits 33 and 34 of the wind power dead band 40. The droop rate of the wind $R_{Wind}$ 32 and 36 defines together with the dead band 40 the overall frequency response for the wind power, in some embodiments the droop rate may be different for high and low frequency situations. In comparison with the response for conventional power 31, it is clear that an allowed overall wind power fluctuation, $\Delta P_{WindFluct}$ 41 is available.

The proposed coordination algorithm is given by the following three steps:

1—Define:
a. Maximum (allowed) static deviation of system frequency following a dimensioning load change, $\Delta f_{Max}$. This value is different among grid codes, as shown in e.g. FIG. 5.
b. Amount of required system frequency activated reserves, $\Delta P_{ResSys}$. This value also differs from system to system and it depends on the dimensioning load change and the load-frequency characteristic.
c. Maximum allowed frequency deviation caused by wind power fluctuations, $\Delta f_{WindFluct}$.
d. Dead band of the speed-governors of conventional plants, $DB_{Conv}$, defined in the respective grid code.

2—Determine the power reserves from the individual generators, including WPPs, as a result from e.g. the trading in the regulation market. This gives:
a. The total amount of reserve from conventional plants, $\Delta P_{ResConv}$.

b. The total amount of reserve from wind power production, $\Delta P_{PRes\ Wind}$.
c. The installed capacity $P_{N\text{-}WPPi}$ of wind plants WPP-i contributing with regulating reserves, i.e. connected to the control system as in FIG. 1. The following basic equation should be satisfied:

$$\Delta P_{ResSys} = \Delta P_{ResConv} + \Delta P_{ResWind} \quad (1)$$

3—Determine the parameters for the centralized wind power frequency control: $DB_{Wind}$, $R_{Wind}$, $\Delta P_{WindFluct}$, $\Delta P_{ResWind}$ and $Ramp_{Wind}$. Based on FIG. 3 and the previous steps, these parameters are given by:

$$DB_{Wind} = \Delta f_{WindFluct} \quad (2)$$

$$R_{Wind} = \frac{\Delta f_{Max} - \Delta f_{WindFluct}}{f_0} \cdot \frac{\sum_n P_{N\text{-}WPPi}}{\Delta P_{ResWind}} \quad (3)$$

$$\Delta P_{Curt} \geq \Delta P_{ResWind} \quad (4)$$

Setting a proper value for $Ramp_{Wind}$ is controversial, since the intention with this ramp is to follow an eventual increase in available power. This increase in production is feasible as long as:
i) the wind power production is allowed to produce differently than the scheduled power,
ii) the grid frequency is below ($f_o + DB_{Wind}$)—otherwise the frequency controller would be activated producing a self-constraining effect—and
iii) the ramp rate setting is according to the bandwidth of the secondary frequency control.

Nevertheless, there is no risk of creating an over-frequency by this ramp increase since the wind power frequency control is activated for frequencies beyond (+) $DB_{Wind}$, generating in this way a self-constraining effect. An obvious drawback of the ramp limiter is that it cannot constrain the wind power drops.

If the wind power production is being operated with a certain $\Delta P_{ResWind}$ 37 as shown in FIG. 3, then the frequency drop caused by a drop in available wind power will make self-use of the frequency activated reserve from the $\Delta P_{ResWind}$ 37. In this way the frequency deviation caused by wind will be self-constrained to a $(-)DB_{Wind}$ 40, giving time for the secondary frequency control actuation. Additionally, after an eventual power drop followed by an increase in available power, the wind power production would be restored automatically with a ramp rate. The value of $Ramp_{Wind}$ should be chosen according to some criteria from the Transmission System Operator (TSO), but in general it should not be larger than the bandwidth of the secondary frequency control.

Figure 4:
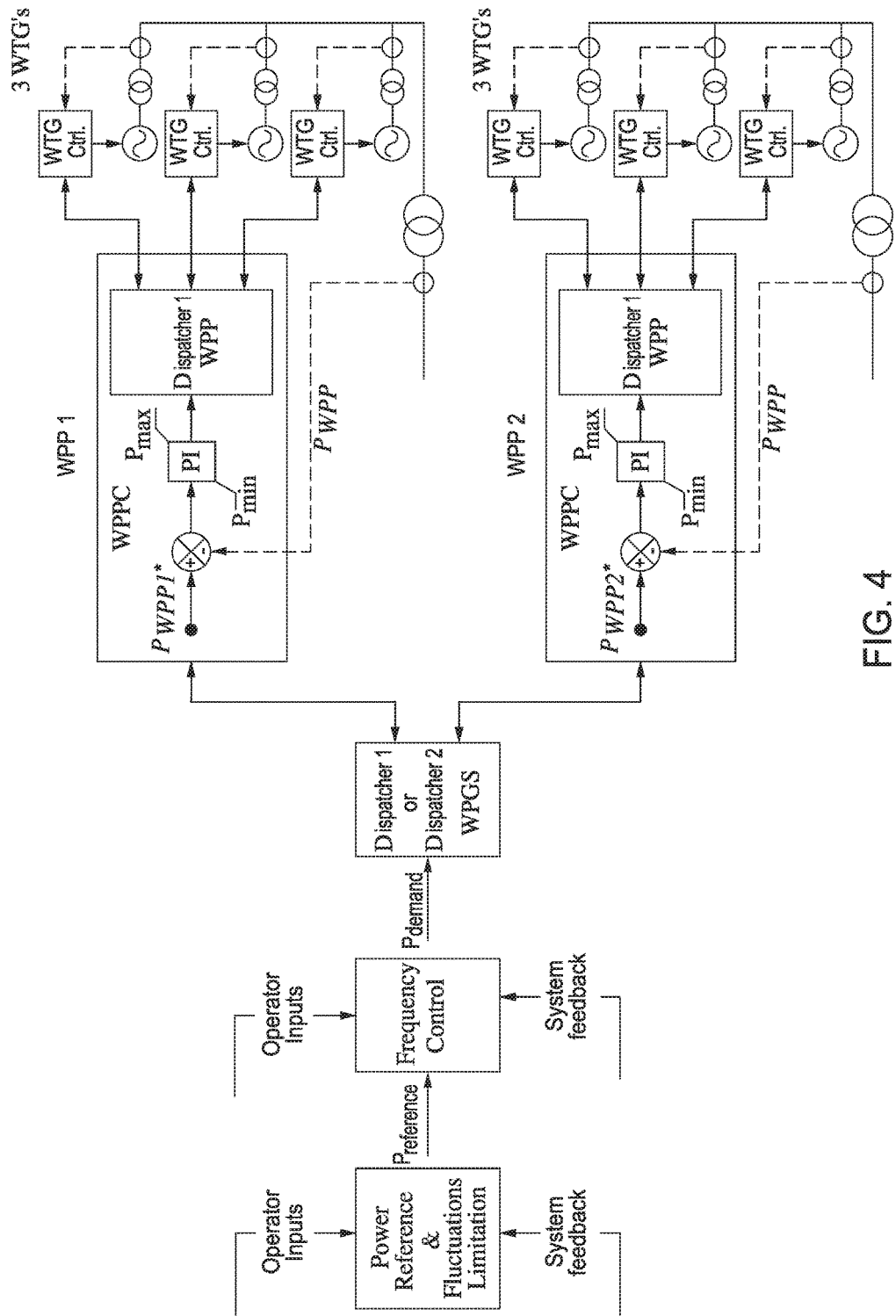
FIG. 4 shows an example of control architectures for wind power production in a power system.

FIG. 4 shows an example of centralized control architecture for a wind power plant.

Figures 5, 6:
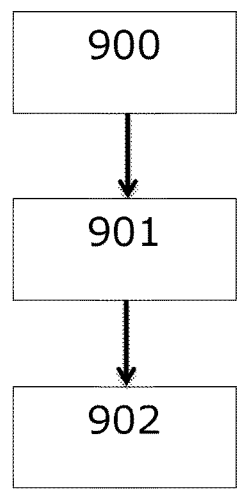
FIG. 5 shows examples of the numerical values of the electrical frequency requirements.
FIG. 6 is a schematic flow chart of an embodiment of the method.

FIG. 5 shows a table with different examples of frequency ranges for various grid requirements as function of the grid system state, where the ranges set the threshold values for the dead bands. The higher the frequency range is the more severe state the grid system is in.

FIG. 6 shows a flow chart of a method according to the invention of operating an electrical power system, comprising at least one wind turbine generator and at least one other power source. Step 900 is setting a set of technical requirements and limits for the electrical power system, including a total power reserve and at least one of: maximum electrical frequency deviation and allowable wind power electrical frequency fluctuations. Step 901 is distributing the total power reserve between the at least one other power source and a total wind power capacity available from the at least one wind turbine generator, and calculating in response thereto an amount of power reserve from the at least one wind turbine generator. And step 902 is providing settings for a wind power controller, the settings comprising the set of technical requirements and the amount of power reserve from the at least one wind turbine generator.

The term other power source is to be understood as a "non-wind power" power source, i.e. conventional coal fired power plant, nuclear power plant or a hydro power plant, but not limited to these types.

The term wind turbine generator, WPS is to be understood both as a single wind turbine generator according to FIG. 1, but in some embodiments it may also be a group of wind turbine generator according to FIG. 1 connected at a point of common coupling, thereby, from a power system operator, seen as one source of wind power from one location.

The term wind power plant, WPP may in some embodiments be a single wind power plant with a plurality of wind turbine generators according to FIG. 1. In other embodiments wind power plant is to be understood as an aggregation of wind power plants located at different geographical location, either adjacent to each other or remote from each other, but all of them are controllable by means of the dispatcher of the present invention.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

Any range or device value given herein may be extended or altered without losing the effect sought, as will be apparent to the skilled person.

It will be understood that the benefits and advantages described above may relate to one embodiment or may relate to several embodiments. It will further be understood that reference to 'an' item refer to one or more of those items.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

What is claimed is:

1. A method for operating an electrical power system comprising at least one wind turbine generator and at least one non-wind power source, the method comprising:
   determining a set of technical requirements and limits for the electrical power system, the set including values of a total power reserve requirement and at least one of: a maximum electrical frequency deviation and allowable wind power electrical frequency fluctuations;
   distributing the total power reserve requirement between the at least one non-wind power source and a total wind power capacity available from the at least one wind turbine generator;
   calculating, in response to distributing the total power reserve requirement, an amount of power reserve to be provided from the at least one wind turbine generator; and
   providing parameters for a wind power controller, the parameters comprising the set of technical requirements and limits and the amount of power reserve to be provided from the at least one wind turbine generator.

2. The method according to claim 1, further comprising:
   determining whether the electrical power system is providing normal operation regulation or providing disturbance regulation; and
   setting values of one or more of the parameters responsive to the determination.

3. The method according to claim 1, wherein the set of technical requirements and limits includes a first value for the allowable wind power electrical frequency fluctuations and a second value for the maximum electrical frequency deviation.

4. The method according to claim 1, wherein determining the set of technical requirements and limits comprises:
   determining a value of the total power reserve requirement based on:
   a value of the maximum electrical frequency deviation,
   a value of a system frequency activated power reserve,
   a value of the allowable wind power electrical frequency fluctuations, and
   a dead band of a speed-governor of the at least one non-wind power source.

5. The method according to claim 4, wherein the value of the total power reserve requirement is a sum of a power reserve to be provided from the at least one non-wind power source and the amount of power reserve to be provided from the at least one wind turbine generator.

6. The method according to claim 5, further comprising:
   determining an amount of wind power curtailment that is greater than or equal to the amount of power reserve to be provided from the at least one wind turbine generator.

7. The method according to claim 1, wherein the wind power controller comprises a wind power frequency controller, the method further comprising:
   determining one or more parameters of the parameters for the wind power controller, wherein the one or more parameters include one or more of:
   a frequency dead band,
   a frequency response characteristic,
   a wind power fluctuation,
   a wind power curtailment, and
   a power tracking ramp rate.

8. The method according to claim 7, wherein the frequency response characteristic is determined according to:

$$R_{Wind} = \frac{\Delta f_{Max} - \Delta f_{Wind}}{f_0} \cdot \frac{\sum_n P_{N-WPPi}}{\Delta P_{ResWind}}.$$

wherein $R_{Wind}$ represents a droop rate, $\Delta f_{Max}$ represents the maximum electrical frequency deviation, $DB_{Wind}$ represents a dead band, $f_0$ represents a nominal grid frequency, $\Sigma_n P_{N\text{-}WPPI}$ represents the total wind power capacity, and $\Delta P_{ResWind}$ represents the amount of power reserve to be provided from the at least one wind turbine generator.

9. The method according to claim 7, wherein the wind power fluctuation is determined according to:

$$\Delta P_{WindFluct} = \frac{\Delta f_{WindFluct} - DB_{Conv}}{\Delta f_{Max} - DB_{Conv}} \Delta P_{ResConv}.$$

wherein $\Delta P_{WindFluct}$ represents an allowed wind power fluctuation, $\Delta f_{WindFluct}$ represents the allowable wind power electrical frequency fluctuations, $DB_{Conv}$ represents a dead band of a speed-governor of the at least one non-wind power source, $\Delta f_{Max}$ represents the maximum electrical frequency deviation, and $\Delta P_{ResConv}$ represents an amount of power reserve to be provided from the at least non-wind power source.

10. An electrical power system comprising:
at least one wind turbine generator;
at least one non-wind power source; and
a controller programmed with settings comprising a total power reserve requirement and at least one of: a maximum electrical frequency deviation and allowable wind power electrical frequency fluctuations, which configure the controller to perform an operation comprising:
distributing the total power reserve requirement between the at least one non-wind power source and a total wind power capacity available from the at least one wind turbine generator; and
calculating, in response to distributing the total power reserve requirement, an amount of power reserve to be provided from the at least one wind turbine generator.

* * * * *